US008897424B2

(12) United States Patent
Werner (10) Patent No.: US 8,897,424 B2
(45) Date of Patent: Nov. 25, 2014

(54) AUTOMATIC CLUSTERING AND VISUALIZATION OF DATA TRENDS

(75) Inventor: Ben Werner, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/546,235

(22) Filed: Jul. 11, 2012

(65) Prior Publication Data

US 2014/0016761 A1 Jan. 16, 2014

(51) Int. Cl.
*H04M 1/64* (2006.01)
*H04M 3/42* (2006.01)

(52) U.S. Cl.
USPC .................................... 379/88.11; 455/416

(58) Field of Classification Search
CPC ..... C08J 2323/06; C08J 3/28; C08L 2314/02; C08L 23/06; C08L 23/0815; G06F 3/04842; G06F 9/44; G06F 9/445; H04M 2203/355; H04M 3/4936
USPC .......................................... 379/88.01–88.19
See application file for complete search history.

(56) References Cited

U.S. PATENT DOCUMENTS

| 6,983,039 | B2 * | 1/2006 | Ishikawa et al. | 379/112.04 |
|---|---|---|---|---|
| 8,401,156 | B1 * | 3/2013 | Milro et al. | 379/88.01 |
| 8,416,715 | B2 * | 4/2013 | Rosenfeld et al. | 370/267 |
| 2006/0147020 | A1 * | 7/2006 | Castillo et al. | 379/220.01 |
| 2008/0010335 | A1 * | 1/2008 | Wyler | 709/201 |
| 2010/0075701 | A1 * | 3/2010 | Shang et al. | 455/466 |
| 2012/0110616 | A1 * | 5/2012 | Kilar et al. | 725/32 |
| 2012/0196558 | A1 * | 8/2012 | Reich et al. | 455/404.1 |
| 2013/0028399 | A1 * | 1/2013 | Kopparapu et al. | 379/88.01 |
| 2013/0117771 | A1 * | 5/2013 | Lee et al. | 725/10 |
| 2013/0271560 | A1 * | 10/2013 | Diao | 348/14.08 |

* cited by examiner

*Primary Examiner* — Fan Tsang
*Assistant Examiner* — Solomon Bezuayehu
(74) *Attorney, Agent, or Firm* — Kilpatrick Townsend & Stockton LLP (57) ABSTRACT

A method of monitoring activity in a contact center may include receiving a plurality of customer interactions; storing a plurality of textual records; grouping the plurality of textual records into a plurality of groups, wherein each of the plurality of groups is associated with an attribute of the associated customer interaction; and causing to be displayed a graphical representation of the plurality of customer interactions comprising a plurality of geometric shapes, where each of the geometric shapes is associated with a corresponding one of the groups; and each of the geometric shapes comprises an area on the display device that is proportional to a size of the corresponding one of the groups relative to sizes of the remaining groups.

20 Claims, 9 Drawing Sheets

AUTOMATIC CLUSTERING AND VISUALIZATION OF DATA TRENDS

BACKGROUND

Customer support may be comprised of a range of customer services to assist customers in making cost-effective and correct use of services and products offered by an organization. Customer service may extend to before, during, and after a purchase, and may include a series of activities designed to enhance the level of customer satisfaction—that is, the feeling that a product or service has met the customer's expectation. In many cases, customer service can play an important role in an organization's ability to generate income and revenue. Therefore, many organizations have implemented systematic approaches to handling customer service contacts in order to improve their customer satisfaction levels and other key performance indicators.

In order to meet its customer service expectations, an organization may implement a customer contact center. The customer contact center can be configured to accept customer service related contacts and to direct them to the appropriate department or solution resource. Customer contact centers can provide automated customer service options, as well as in-person assistance. However, in the Internet era, it may be challenging to maintain and/or enhance the personal experience and overall satisfaction of customers utilizing the contact center.

BRIEF SUMMARY

According to one embodiment, a method of monitoring activity in a contact center is provided. The method may include receiving a plurality of customer interactions, and storing a plurality of textual records in a memory. Each of the plurality of textual records may be derived from a corresponding one of the plurality of customer interactions. The method may also include grouping the plurality of textual records into a plurality of groups. Each of the plurality of groups may be associated with an attribute of the associated customer interaction. The method may additionally include causing to be displayed on a display device, a graphical representation of the plurality of customer interactions comprising a plurality of geometric shapes. Each of the plurality of geometric shapes may be associated with a corresponding one of the plurality of groups. Furthermore, each of the plurality of geometric shapes may comprise an area on the display device that is proportional to a size of the corresponding one of the plurality of groups relative to sizes of the remaining groups in the plurality of groups.

According to another embodiment, a computer-readable memory having stored thereon a sequence of instructions is presented. The sequence of instructions, when executed by one or more processors, causes the one or more processors to monitor activity in a contact center by receiving a plurality of customer interactions, and storing a plurality of textual records in a memory. Each of the plurality of textual records may be derived from a corresponding one of the plurality of customer interactions. The instructions may also cause the processor to operate by grouping the plurality of textual records into a plurality of groups. Each of the plurality of groups may be associated with an attribute of the associated customer interaction. The instructions may additionally cause the processor to operate by causing to be displayed on a display device, a graphical representation of the plurality of customer interactions comprising a plurality of geometric shapes. Each of the plurality of geometric shapes may be associated with a corresponding one of the plurality of groups. Furthermore, each of the plurality of geometric shapes may comprise an area on the display device that is proportional to a size of the corresponding one of the plurality of groups relative to sizes of the remaining groups in the plurality of groups.

According to yet another embodiment, a system including one or more processors, and a memory communicatively coupled with and readable by the one or more processors is presented. The memory may have stored therein a sequence of instructions which, when executed by the one or more processor, cause the one or more processor to monitor activity in a contact center by receiving a plurality of customer interactions, and storing a plurality of textual records in a memory. Each of the plurality of textual records may be derived from a corresponding one of the plurality of customer interactions. The instructions may also cause the one or more processors to operate by grouping the plurality of textual records into a plurality of groups. Each of the plurality of groups may be associated with an attribute of the associated customer interaction. The instructions may additionally cause the one or more processors to operate by causing to be displayed on a display device, a graphical representation of the plurality of customer interactions comprising a plurality of geometric shapes. Each of the plurality of geometric shapes may be associated with a corresponding one of the plurality of groups. Furthermore, each of the plurality of geometric shapes may comprise an area on the display device that is proportional to a size of the corresponding one of the plurality of groups relative to sizes of the remaining groups in the plurality of groups.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Described herein, are embodiments for monitoring and visualizing activity in a contact center. A contact center may receive customer interactions in a number of different forms and mediums. Each of these customer interactions may be recorded or otherwise represented in a textual format. For example, a telephone conversation may be transcribed, a log of the web chat may be recorded, or relevant fields from an error message may be extracted. The textual records may be analyzed by a grouping engine and assigned values corresponding with one or more attributes. At least one of these attributes can be used to represent a topic, or intent of the customer interaction. Groups can be formed according to the attributes and values, and groups can be displayed on a display of a computer system for a supervisor to monitor. In one embodiment, a graphical display can show geometrical shapes that are colored and sized according to the size of the groups, along with other group characteristics. As customer interactions are added or expire, the graphical shapes representing each group can be resized, recolored, or otherwise altered in real time such that the display is always up-to-date.

Prior to this disclosure, supervisors in contact centers had very little information regarding the overall ebb and flow of customer communications. At best, contact center employees could run a report, in which the employee would be required to provide a number of database values so that a report generation engine could supply relevant records. Furthermore, customer interactions in some cases were very brief and handled in real-time by a customer service representative. These brief interactions often went unrecorded, and were resolved very quickly, leaving no open tickets in the customer service system.

Although brief and quickly resolved, these interactions could provide useful information to a contact center supervisor. For example, a large volume of calls concerning a quickly resolved bug in an application may not have resulted in any open service tickets, but they could provide valuable clues and information for a software debugging department. Furthermore, a contact center supervisor could adjust manpower needs according to the topics, sources, and destinations of incoming customer interactions. These and many other advantages may be provided by embodiments discussed herein. Other advantages will be clear in light of this disclosure.

Figure 1:
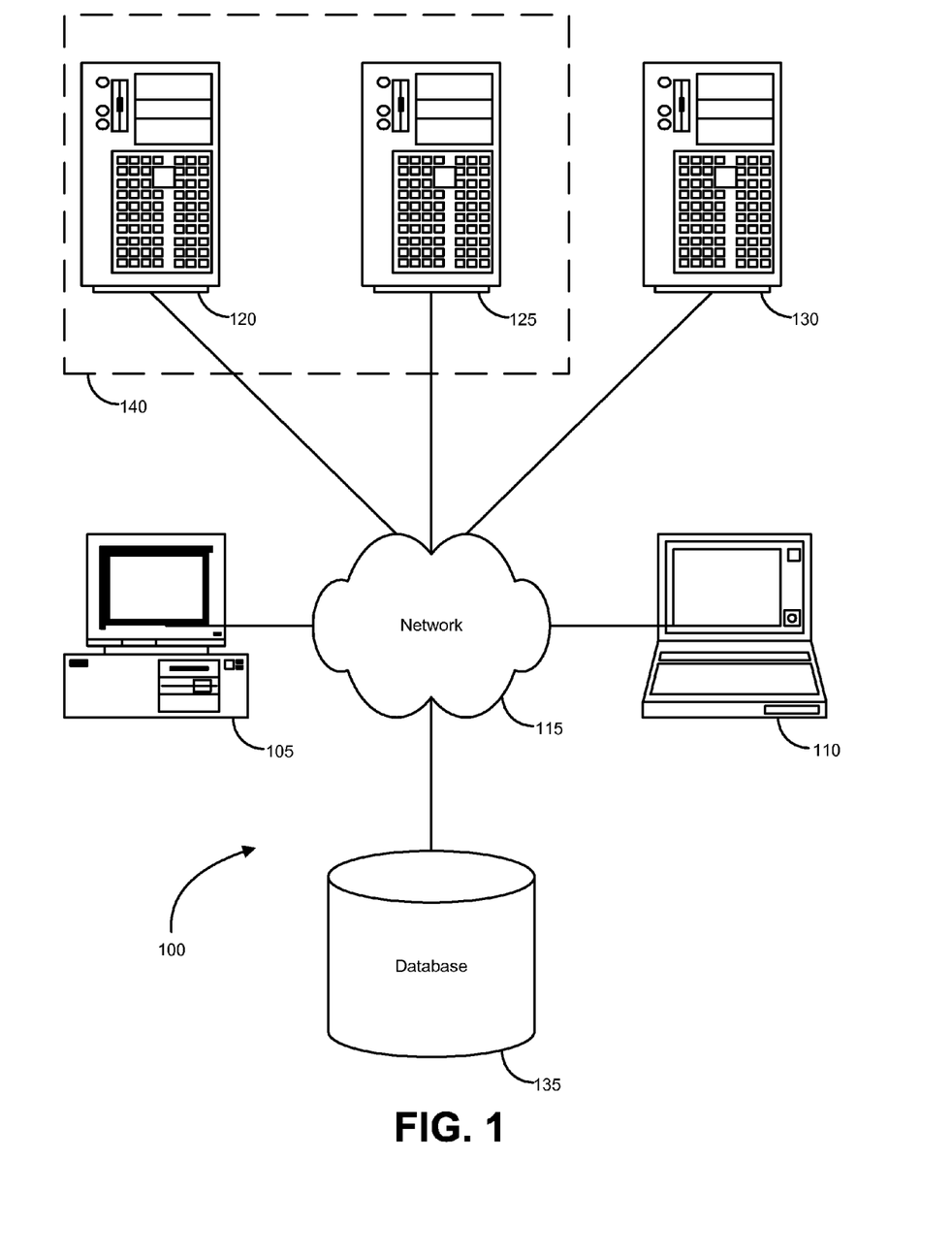
FIG. 1 illustrates a block diagram illustrating components of an exemplary operating environment in which various embodiments of the present invention may be implemented.

Each of the embodiments disclosed herein may be implemented in a computer system. FIG. 1 is a block diagram illustrating components of an exemplary operating environment in which various embodiments of the present invention may be implemented. The system 100 can include one or more user computers 105, 110, which may be used to operate a client, whether a dedicated application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems) and/or browser software. These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
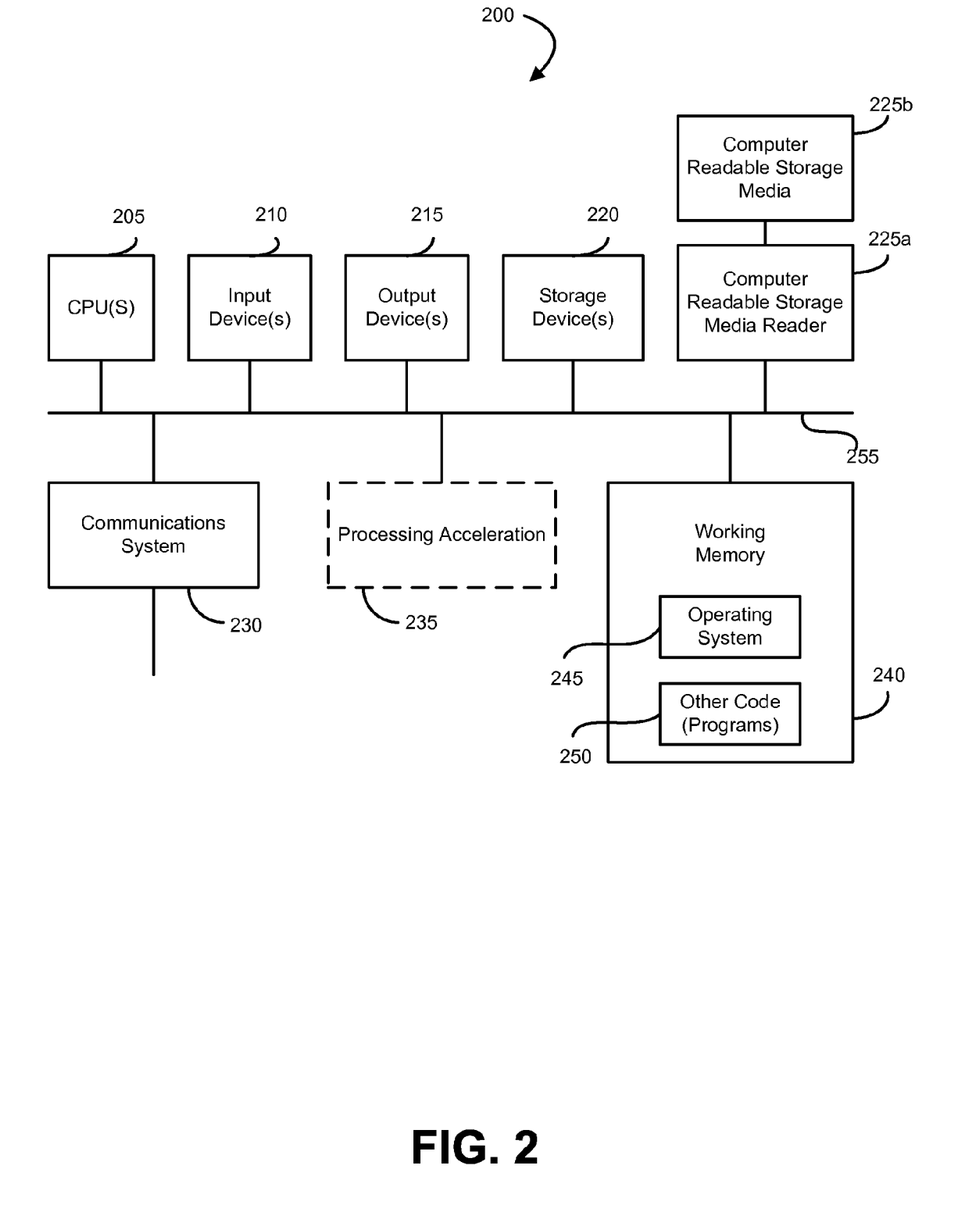
FIG. 2 illustrates a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

The following methods may be implemented by a computer system, such as computer system 200 in FIG. 2. Each step of these methods may be done automatically by the computer system, and/or may be provided as inputs and/or outputs to a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a Web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Therefore, it will be understood in light of this disclosure, that each step and each method described herein may be altered to include an input and output to and from a user, or may be done automatically by a computer system.

Figure 3:
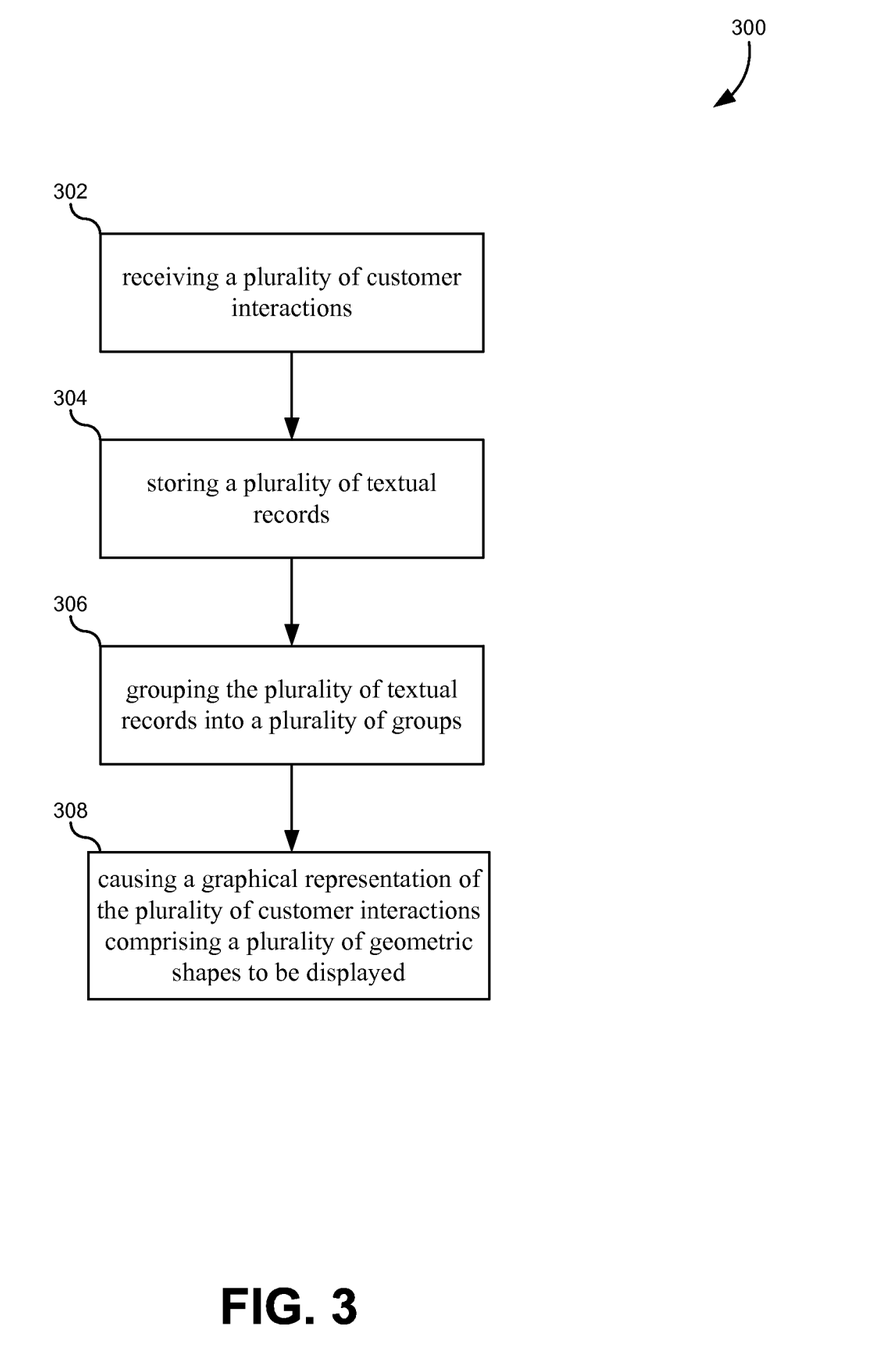
FIG. 3 illustrates a flowchart of a method of monitoring activity in a contact center, according to one embodiment.

FIG. 3 illustrates a flowchart 300 of a method of monitoring activity in a contact center, according to one embodiment. This method can be implemented in a computer system, and can be embodied in a set of instructions that can be executed by a processor, which when executed cause the processor to monitor the activity of a contact center. As used herein, a "contact center" can comprise any system used for the purpose of receiving, transmitting, and/or handling a large volume of requests by customers. A contact center may be a single office, or it may be distributed amongst many offices, both real and virtual. For example, a contact center can be operated by a company to administer incoming product support or information inquiries from customers. A contact center may also be known as a customer interaction center and is generally a central point where all customer contacts are managed. Valuable information about products and services can be routed to appropriate people, contacts can be tracked, and data can be gathered.

FIGS. 4-7 illustrate an exemplary contact center system that is used to illustrate each of the steps of the method in FIG. 3. It will be understood that various modules, systems, and arrangements shown in FIGS. 4-7 are merely exemplary, and that the contact center system may be arranged differently according to the various needs of each individual business.

Figure 4:
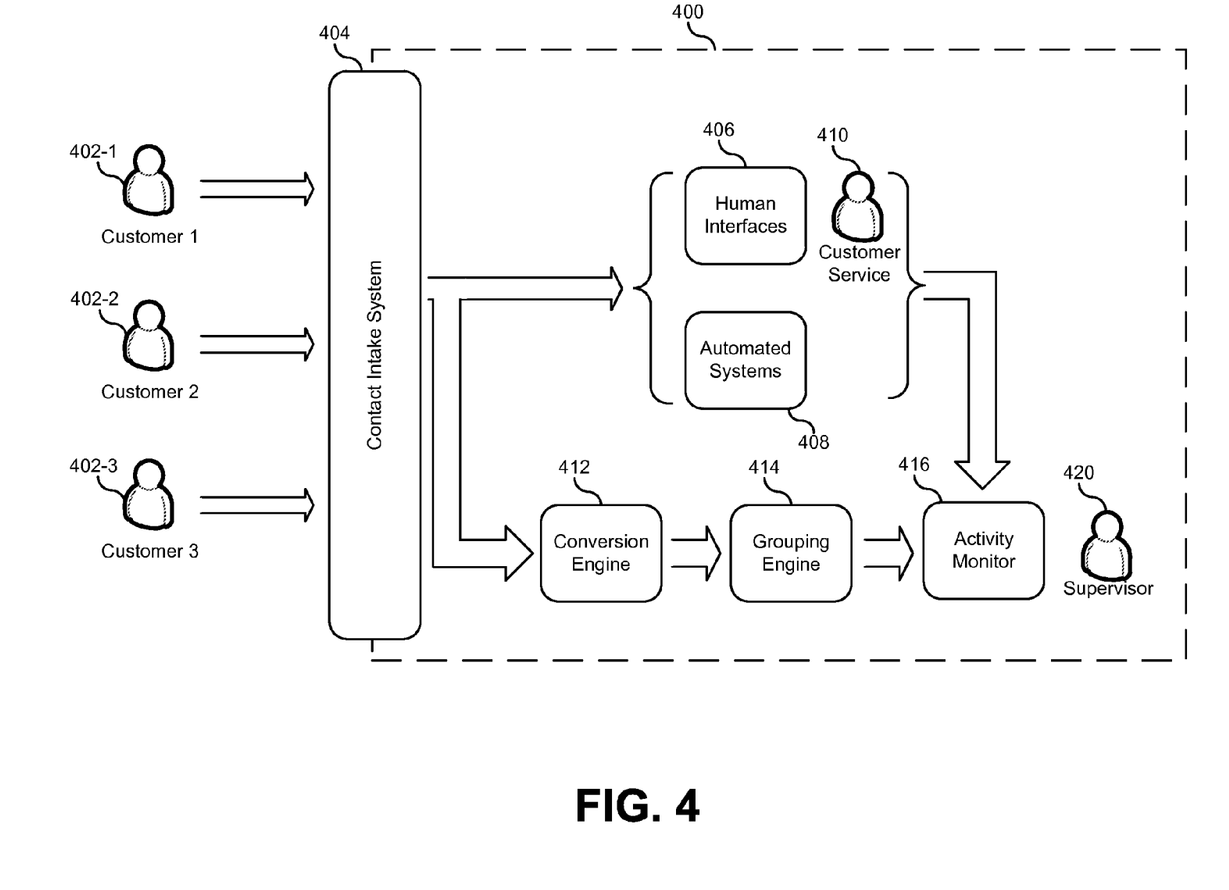
FIG. 4 illustrates a simplified block diagram of contact center, according to one embodiment.

The method may include receiving a plurality of customer interactions (302). FIG. 4 illustrates a simplified block diagram of contact center 400, according to one embodiment. The contact center 400 can be used to receive the plurality of customer interactions from many different customers 402 using a contact intake system 404. The contact intake system 404 is configured to handle many customer interactions simultaneously, and can handle customer interactions in many different forms. For example, customer 402-1 may use a telephone, customer 402-2 may use a web chat, and customer 402-3 may use software that submits an error log automatically. Another customer may submit an e-mail question (not shown). The contact intake system 402 can handle each of these customer interactions through specifically designed interfaces for each communication method.

The contact center 400 will often be configured to address concerns embodied in the customer interactions. The contact center 400 can include automated systems 408 that are configured to handle incoming concerns by automatically deploying patches for software or the like. The automated systems 408 can also create service tickets directing human customer service agents to handle the customer concerns. The contact center 400 can also include human interfaces 406 where customer service agents 410 can interact in real-time with customers, depending on the communication medium.

In various embodiments discussed herein, the contact center 400 can also include a number of systems that are configured to monitor the activity of the contact center. In one embodiment, the contact center 400 includes a conversion engine 412 for converting the customer interactions into a format that can be analyzed. The contact center 400 may also include a grouping engine 414 used to group representations of the customer interactions into useful categories for analysis. In one embodiment, a useful category may be based on the sentiment or emotion of the customer, i.e. was the customer pleased with the service, or was the customer happy with the product, etc. The contact center 400 may also include an activity monitor 416 that can provide a display of the activity of the contact center 400 incorporating feedback and analysis for a supervisor 420. As used herein, a "supervisor" may refer to any person or system responsible for monitoring activity of the contact center 400. The activity monitor 416 may also receive inputs from the human interfaces 406 and the automated systems 408 such that incoming activity can be monitored, along with how the incoming the activity is being handled by the contact center 400.

In one embodiment, the various modules and systems in FIG. 4 may reside on separate computer systems. Alternatively, multiple modules may be combined on the same or similar computer systems. In addition, some modules may be combined together into a single module performing the functions of both individual modules. Similarly, a single module may be split into multiple modules. It will be understood in light of this disclosure that any arrangement of the modules, as well as any implementation in both software and hardware, may be used by various embodiments.

Referring briefly back to FIG. 3, the method may also include storing a plurality of textual records (304). In one embodiment, each of the plurality of textual records is derived from a corresponding one of the plurality of customer interactions. As stated earlier, the contact intake system 404 can be configured to handle many different types of communications. Some of these communications may be textual, while others may need to be converted to text. Textual and non-textual communications may need to be further analyzed and put into a format suitable for the grouping engine 414. Certain embodiments can use a special module as a conversion engine to translate customer interactions into a textual format that can be analyzed.

Figure 5:
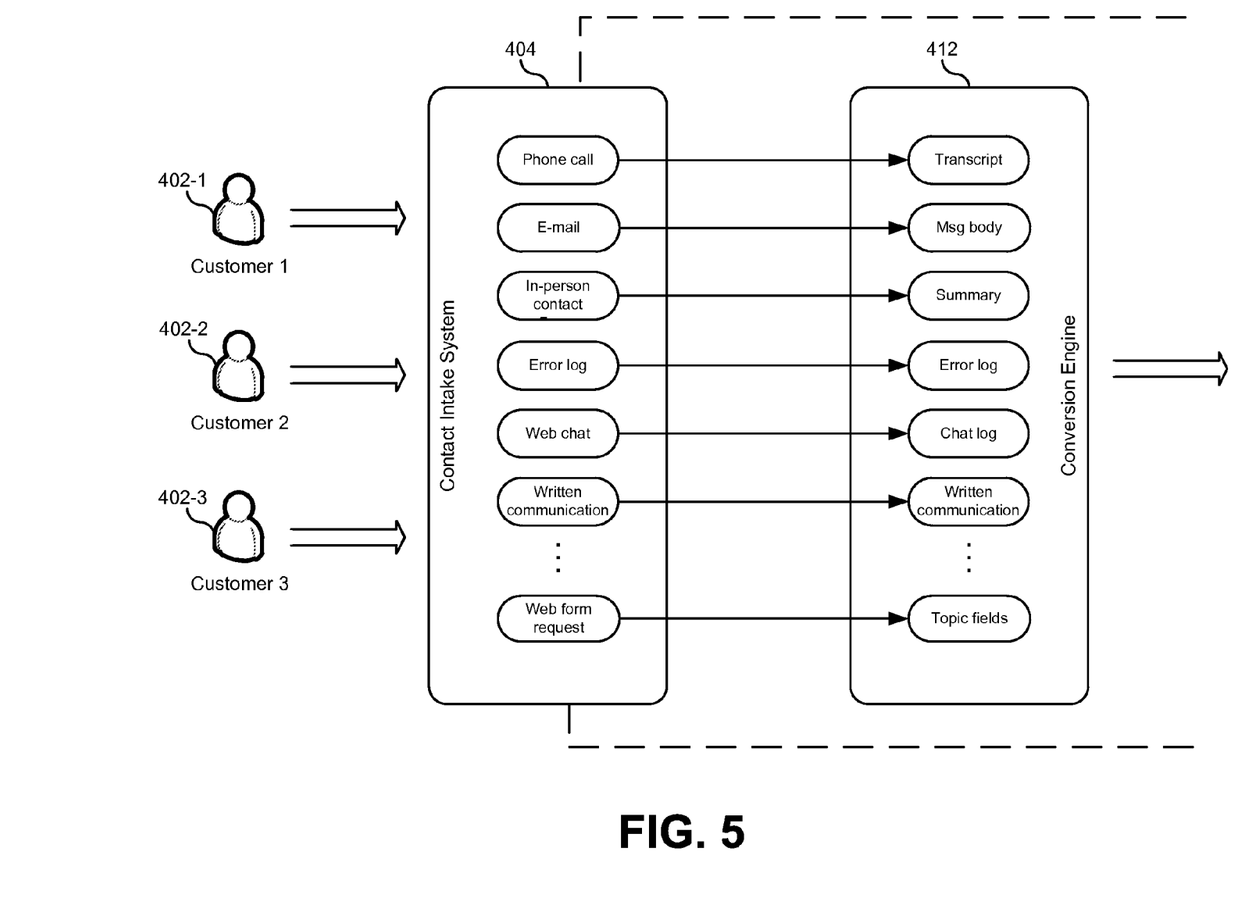
FIG. 5 illustrates a simplified block diagram of a conversion engine, according to one embodiment.

FIG. 5 illustrates a simplified block diagram of a conversion engine 412, according to one embodiment. Customers 402 supply customer interactions to the contact intake system 404. This simplified block diagram shows a number of different possible customer interaction formats. These formats can include, but are not limited to, phone calls, e-mails, in-person contacts, error log reporting, web chats, written communications, web form requests, and/or the like. In short, any means of communication that can be received by either a human interaction or automated system can be utilized by this embodiment.

A conversion engine 412 can handle each of the various customer interaction formats and convert them into a format that can be analyzed. In one step, the conversion engine 412 can convert any customer interactions that are not text-based into textual records. For example, a phone call may be converted into a transcript of the spoken words. An in-person contact may be converted into a transcription of relevant portions of the conversation, or could include a summary written by a customer service employee. A written communication can be converted using well-known OCR techniques into a computer readable document.

In some cases, the customer interaction may already be in a text-based format. This may be the case when the customer uses a web form, a web chat, or an e-mail. In some embodiments, the conversion engine 412 may simply accept the text-based customer interaction as a textual record. In other embodiments, additional formatting can be required. For example, a text-based document can be analyzed and formatted into different fields and values that will be useful for the grouping engine 414. For e-mails, the subject line, and the message body can be extracted and stored. For a web chat, the transcript can be divided according to who is typing. For a web form, the field names can be associated with the values typed in by the customer. In short, text-based documents can be further processed and formatted such that they are more easily processed by the grouping engine 414. Note that these examples are not meant to be limiting, and text-based documents can be reformatted or processed in many different ways that may be unique to each implementation. Some embodiments do not require any sort of formatting for the input textual records to be effectively processed by the grouping engine.

Referring briefly back to FIG. 3, the method may further include grouping the plurality of textual records into a plurality of groups (306). In one embodiment, each of the plurality of groups can be associated with a dynamically detected and generated attribute of the associated customer interaction. The purpose of the grouping engine is to assign attributes and values to the textual records corresponding to the customer interactions. These attributes and values can be used to associate the plurality of textual records into a number of different groups. These groups can then be displayed graphically in order to analyze and monitor the activity in the contact center.

Figure 6:
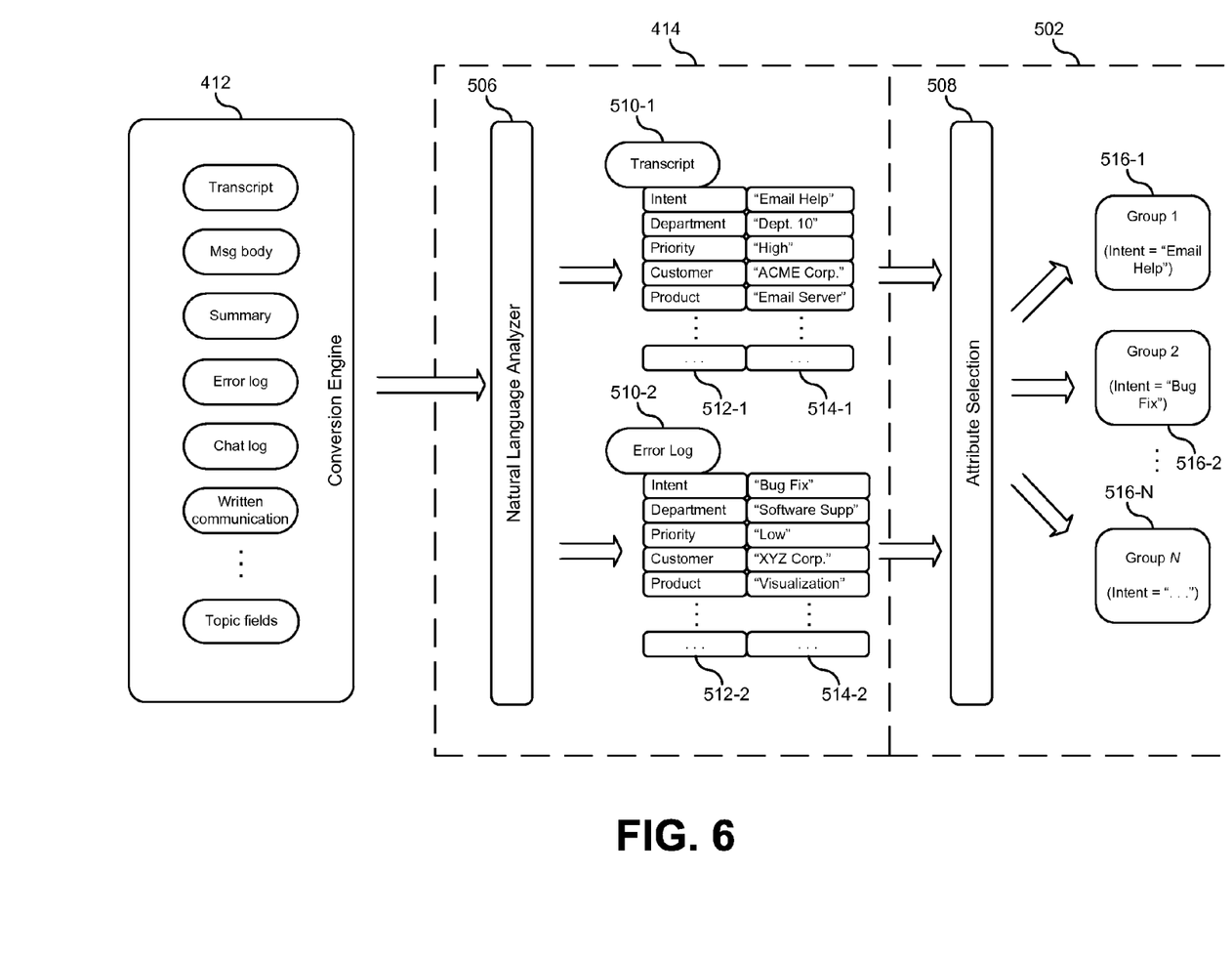
FIG. 6 illustrates a simplified block diagram of a grouping engine, according to one embodiment.

FIG. 6 illustrates a simplified block diagram of a grouping engine 414, according to one embodiment. The grouping engine 414 can receive a batch of textual records from the conversion engine 412. Within the grouping engine 414, the textual records can be received by a natural language analyzer 506, which can parse and analyze the textual records. In some embodiments, the natural language analyzer 506 can interpret written and spoken phrases in plain English such that multiple phrases describing the same thing can be correlated together. For example, a first customer can submit a complaint on a web form with the phrase "my e-mail isn't working." Similarly, a second customer can send an e-mail to a customer service department with the phrase "I can't send any messages to coworker X." The natural language analyzer 506 can interpret each of these two phrases by examining the structure of the sentences and by matching synonymous terms in order to determine that both messages deal with the same intent.

In one embodiment, a user may enter a set of values for each of the attributes that should be used to classify the textual records. For example, an "intent" attribute may be selected as one category by which textual records should be classified. A set of values may be defined that relate to common questions asked in customer interactions. Values may correspond to topics in an FAQ that is maintained by an entity operating the contact center. The intent values can also correspond to subjects for which experts have been hired to provide customer service. The intent values can correspond to goals or themes of an organization's products. Many other types of intent values can be used to classify textual records.

In another embodiment, statistical methods may be used by the natural language analyzer 506 in order to determine values that could be assigned to an attribute. For example, using the "intent" attribute described above, the natural language analyzer 506 could extract intents from the textual records themselves. Thresholds could be used in order to determine which intents expressed in the textual records occur often enough to justify assigning a value. To illustrate, the natural language analyzer 506 could receive 500 customer interactions regarding problems with a content server. The natural language analyzer could extract an intent corresponding to "fix the content server" from the textual records, and determined that this intent is expressed often enough to justify a value for the intent attribute. Similarly, the natural language analyzer 506 could receive three customer interactions related to complaints about a particular employee, among other things. The natural language analyzer 506 could determine that there are not enough customer interactions related to an intent expressed as "Jason is a bad employee" to justify a value being assigned to the intent attribute. In this regard, thresholds or other statistical methods may be used.

Thus far, only an attribute related to "intent" has been discussed. However many other attributes may be used to classify textual records by the grouping engine 414. For example, other attributes may include, but are not limited to, a particular department, a priority level, a customer, a product, a location, a level of customer satisfaction, a number of contacts by a particular customer, and/or the like. Each of these attributes may be entered by a user, or can be determined statistically by the grouping engine 414. For example, if the grouping engine 414 determines that textual records can be categorized based on a customer location, the grouping engine 414 could automatically determine that "location" should be an attribute.

A single textual record can be assigned multiple attributes. For example, in FIG. 6 a textual record corresponding to a transcript 510-1 is classified according to multiple attributes 512-1. Each of the attributes 512-1 has at least one value assigned 514-1. For example, the transcript 510-2 has a value of "e-mail help" assigned to the intent attribute, a value of "Dept. 10" assigned to the department attribute, a value of "high" assigned to the priority attribute, a value of "Acme Corp." assigned to the customer attribute, and a value of "e-mail server" assigned to the product attribute. Note that additional attributes and values may also be assigned that are not shown in FIG. 6.

A second text record can be assigned the same attributes as the first text record, but with different values. For example, in FIG. 6 a textual record corresponding to an Error Log 510-2 submitted automatically from a user system is classified according to multiple attributes 512-2. Each of the attributes 512-2 has at least one value assigned 514-2. For example the Error Log 510-2 has a value of "bug fix" assigned to the intent attribute, a value of "software support" assigned to the department attribute, a value of "low" assigned to the priority attribute, a value of "XYZ Corp." assigned to the customer attribute, and a value of "visualization" assigned to the product attribute. Note that additional attributes and values may also be assigned that are not shown in FIG. 6. Also note that the error log 510-2 could omit any of the listed attributes that were listed for the transcript 510-1. In other words some textual records may be classified with attributes that are not used to classify other textual records. For example, a customer interaction complaining about a company in general may not be appropriately classified with a department attribute or a product attribute.

In one embodiment, the grouping engine 414 can assign attribute/value pairs to each textual record. These attribute/value pairs can be stored as fields in a database, or may be appended to an object in memory associated with the textual records themselves. In another embodiment, the grouping engine 414 may not store any actual attribute/value pairs, but can instead sort the textual records into groups that represent the attribute/value pairs, storing a value with each group. The group may consist of pointers to memory locations that represent the textual records. Many other software and hardware implementations can also be used by various embodiments.

In one embodiment, sub module 502 may comprise an attribute selection module 508 that allows a user or a computer system to select attributes for display. For example, a supervisor may select the attribute of "priority" for display. This may correspond to instances when a supervisor would like to assess the relative numbers of high, medium, and low priority interactions within the contact center. The attribute selection module 508 can be used to group the textual records according to values associated with the priority attribute. In the example of FIG. 6, the intent attribute has been selected and groups 516 have been created according to the various values associated with the intent attribute in the textual records. Each of these values may be considered to have met a particular threshold number of textual records. These groups may then be passed on to the activity monitor 416.

Note that sub-module 502 is depicted as a part of the grouping engine 414 in FIG. 6. In one embodiment, the grouping engine 414 handles the attribute selection and delivers groups to the activity monitor 416. In another embodiment, sub-module 502 may be a stand-alone module, or may alternatively be incorporated within the activity monitor 416.

Although not shown explicitly in FIG. 6, groups can be configured hierarchically. For example, all of the textual records may first be grouped according to one attribute, such as intent. Within each intent group, the textual records may then be grouped according to a second attribute, such as customer. Within each of the customer groups, the textual records may then be grouped according to a third attribute, and so forth. This may provide a supervisor the ability to drill down within each group and see how additional attributes are distributed, or to investigate the data more deeply. For example, if the first group is based on intent, then a supervisor could drill down within the intent group and determine how many textual records in each intent group are assigned a high priority. It will be understood that many different types of groupings can be used, and different hierarchies can be established according to the needs of the contact center.

Referring briefly back to FIG. 3, the method may further include causing a graphical representation of the plurality of customer interactions comprising a plurality of geometric shapes to be displayed (308). In one embodiment, the geometric shapes can be displayed on an output device 215 of the computer system 200 of FIG. 2. Each of the geometric shapes can be associated with a corresponding one of the groups of textual records. In one embodiment, each of the plurality of geometric shapes comprises an area on the display device that is proportional to the size of the corresponding group. Each of the geometric shapes may be sized proportional to the remaining geometric shapes such that their sizes are relative to the number of textual records associated with each group. In other words, a group with a large number of textual records will be associated with a shape much larger than a shape associated with a group with only a small number of textual records.

Figure 7:
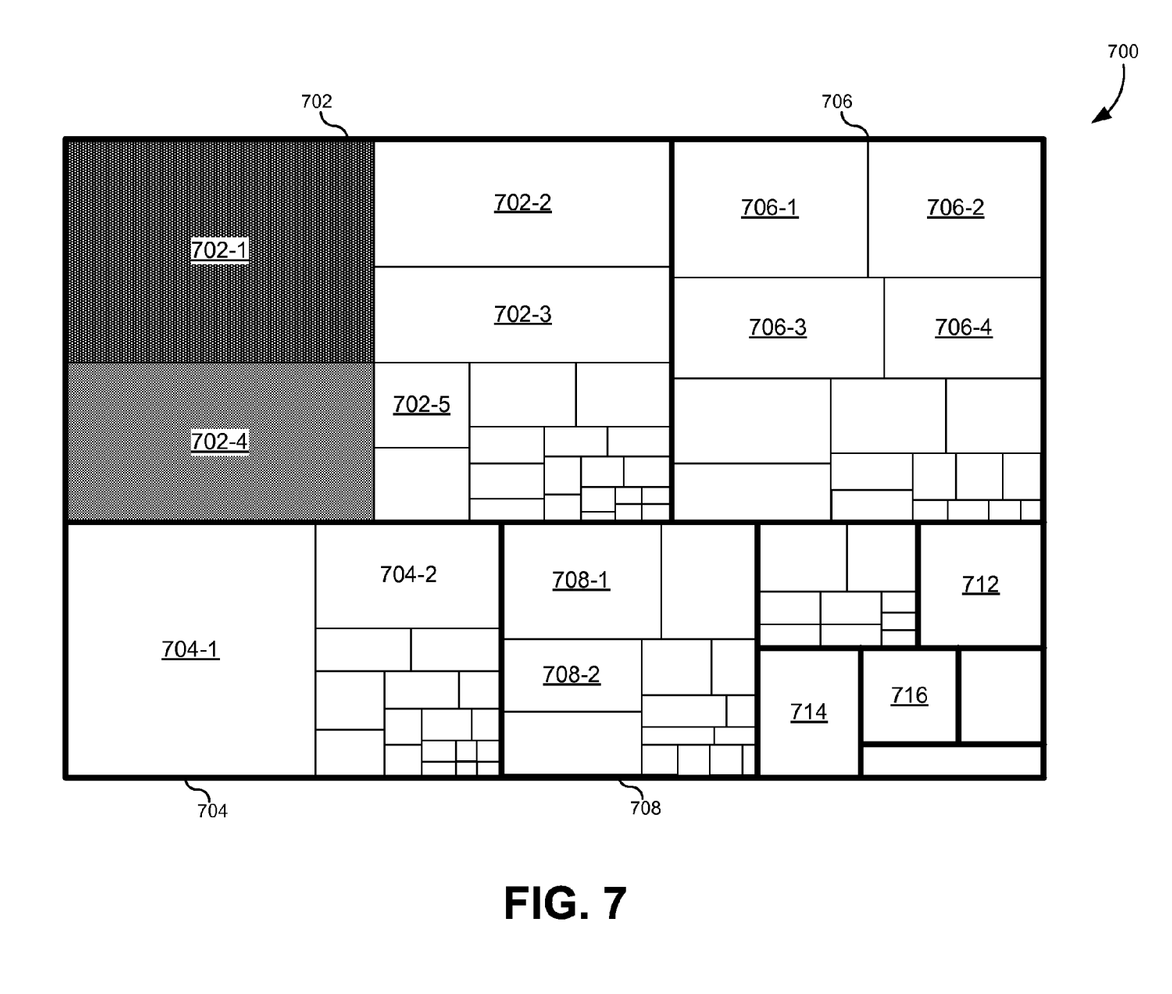
FIG. 7 illustrates an exemplary view of a plurality of geometric shapes on a display device, according to one embodiment.

FIG. 7 illustrates an exemplary view 700 of a plurality of geometric shapes on a display device, according to one embodiment. In this embodiment, the geometric shapes comprise rectangles. The large rectangles with the bold outlines, including rectangles 702, 704, 706, 708, 712, 714, and 716 are associated with a top-level group of textual records. For example, rectangles 702, 704, 706, 708, 712, 714, and 716 can be associated with intent groups, each of which has a unique value assigned to the intent attribute. In this embodiment, each of the rectangles 702, 704, 706, 708, 712, 714, and 716 is sized proportionally to the remaining rectangles according to the number of textual records falling within each intent group. Moreover, each of the rectangles 702, 704, 706, 708, 712, 714, and 716 is sized such that their total area comprises the entire view 700.

Within each of the rectangles 702, 704, 706, 708, 712, 714, and 716, smaller rectangles are shown to subdivide each of the rectangles 702, 704, 706, 708, 712, 714, and 716. Smaller rectangles can correspond to one or more additional attributes. As described above, groupings can be hierarchical, such that additional groups may be formed within a first group based on additional attributes. In this embodiment, rectangles 702 contain smaller rectangles 702-1, 702-2, 702-3, 702-4, and 702-5. Each of the smaller rectangles 702-1, 702-2, 702-3, 702-4, and 702-5 can correspond to groupings of additional attributes. For example, if rectangles 702, 704, 706, 708, 712, 714, and 716 represent grouping of the intent attribute, then smaller rectangles 702-1, 702-2, 702-3, 702-4, and 702-5 can represent groupings of the customer attribute or the priority attribute. Note that smaller rectangles 702-1, 702-2, 702-3, 702-4, and 702-5 are also sized proportionally to correspond to the size of their respective groups, and in order to fill rectangle 702.

In one embodiment, filtering criteria may be used on the groups to remove and/or highlight certain values. Thus, the computer system may receive filtering criteria and ascertain groups that do not meet the filtering criteria. The geometric shapes associated with these groups can be removed from the display device. The filtering criteria may be applied in real-time and may be adjusted as needed by the contact center supervisor. For example, filtering criteria can be related to a minimum size of the group. Therefore, the contact center supervisor can set a minimum threshold value for group size, and the system will only display groups with a size above the threshold. In another example, the filter criteria can be related to a time period. Thus, the contact center supervisor can set a beginning time and ending time defining a time period. Textual records may be removed from groups that do not have an attribute value that falls within the time period.

The example of in FIG. 7 may be described as a tree map. Other graphical representations may be used to depict the geometric shapes that are sized according to their corresponding groups. In other embodiments, a graph may be used, as well as bar charts, pie charts, mind maps, Venn diagrams, histograms, and/or the like.

In some embodiments described thus far, the activity monitor 416 displays the geometric shapes as a snapshot of the activity in the contact center at a given point in time. However, other embodiments allow for additional customer interactions to be converted to textual records and added to the various groups. Similarly, textual records may be removed from the group when they have been handled by the contact center or otherwise expired. The activity monitor 416 can then display these changes in real-time on a display device. In other words, some embodiments provide for a display that is constantly updated and provides the contact center supervisor with a real-time summary of the activity of the contact center.

Figure 8:
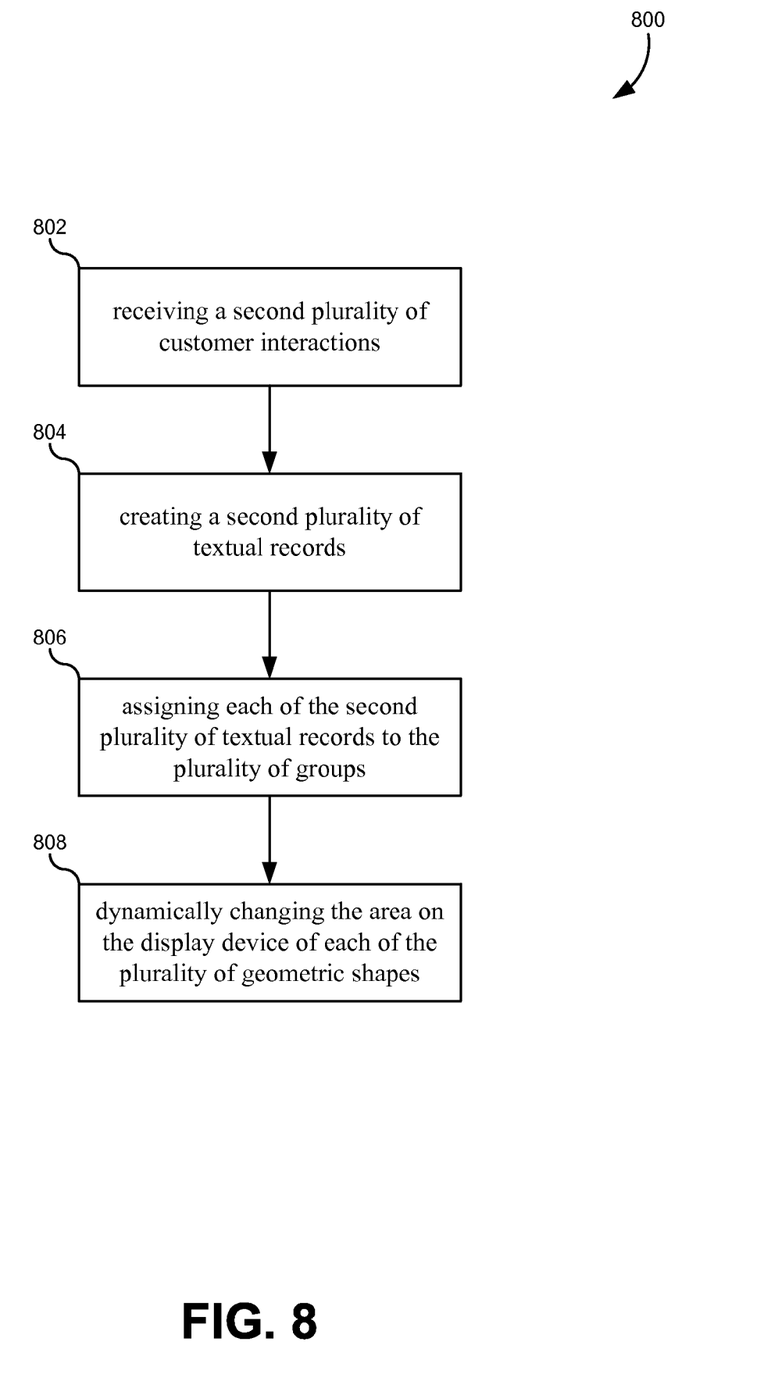
FIG. 8 illustrates a flowchart of a method of updating the activity in a call center, according to one embodiment.

FIG. 8 illustrates a flowchart 800 of a method of updating the activity in a call center, according to one embodiment. The method may include receiving a second plurality of customer interactions (802). In one embodiment, each of the second plurality of customer interactions originated at a time subsequent to a time that the original plurality of customer interactions originated. In other words, the second plurality of customer interactions may have occurred subsequent to the time that the display was first generated. In one embodiment, the second plurality of customer interactions may be held until a threshold number have been received, at which time the second plurality of customer interactions may be processed as a batch. In another embodiment, the second plurality of customer interactions may be incrementally fed through the system such that they update the groups in real-time.

The method may also include creating a second plurality of textual records (804). In one embodiment, each of the second plurality of textual records can be derived from a corresponding one of the second plurality of customer interactions. The conversion engine 412 can convert each of the second plurality of customer interactions into a textual record as was described in relation to FIG. 5 above.

The method may additionally include assigning each of the second plurality of textual records to the plurality of groups (806). In one embodiment, the textual records may be assigned based on an attribute of each of the associated customer interactions. In some cases, the second plurality of textual records may be assigned to the existing groups. In other cases, the second plurality of textual records should be first added to the original plurality of textual records, and the entire group should be statistically analyzed to create new groups, remove old groups, and/or reassign the textual records to the groups. For example, if the second plurality of textual records includes attributes that were not present in the original plurality of textual records, the new groups may be added.

In one embodiment, the method may additionally include identifying expired textual records, and removing the expired textual records from the plurality of groups. A textual record may be considered expired after a certain time period has passed since it was first received by the contact center. Alternatively or additionally, a textual record may be considered expired when an associated product is no longer supported, an associated department no longer exists, or the like. In short, a textual record may be considered expired when one or more of its attribute values is no longer relevant. In another embodiment, a textual record may be considered expired when the customer interaction is closed, i.e. the customer's needs have been met by the contact center. Thus, the activity monitor 416 may include an input from the customer service portion of the contact center as shown in FIG. 4.

Figure 9:
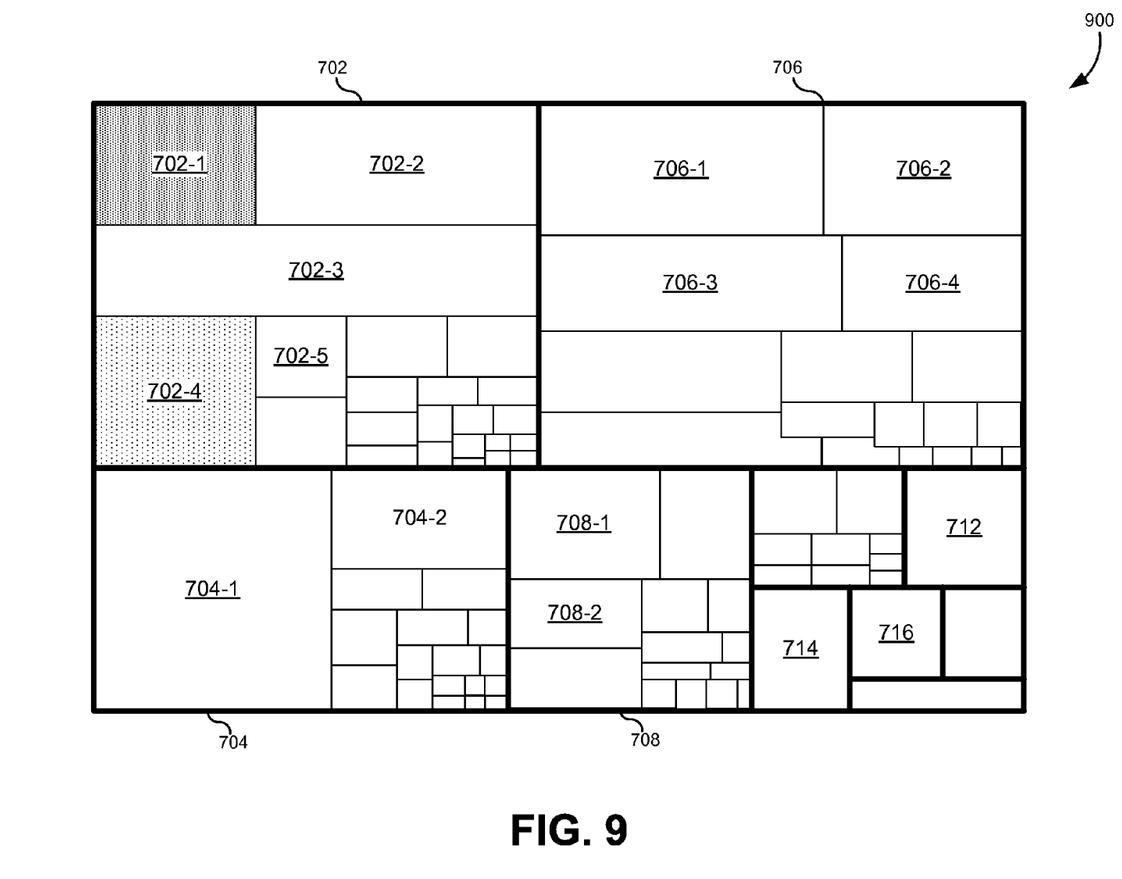
FIG. 9 illustrates an exemplary view of an updated plurality of geometric shapes on a display device, according to one embodiment.

The method may further include dynamically changing the area on the display device of each of the plurality of geometric shapes (808). In one embodiment, the geometric shapes change an animated fashion such that their sizes change continuously. FIG. 9 illustrates an exemplary view 900 of an updated plurality of geometric shapes on a display device, according to one embodiment. View 900 may be considered an update of view 700 from FIG. 7. In this embodiment, the groups associated with rectangles 704, 708, 712, 714, and 716 have not changed. However, the groups associated with rectangles 702 and 706 have changed. Specifically, the group associated with rectangle 702 has shrunk, while the group associated with rectangle 706 has grown.

Additionally, the subgroups within each of rectangles 702 and 704 have also changed in size. In rectangle 702, rectangle 702-1 has shrunk, rectangle 702-3 has grown, and rectangle 702-4 has shrunk. Similarly, in rectangle 706, rectangle 706-1 and rectangle 706-3 have both grown. Note that these changing shapes sizes may occur all at once as batches of customer interactions are processed, or may happen in real-time resulting in a continuous animation.

In one embodiment, colors may be associated with a direction of change in the size of each shape. In other words, one color may be assigned to shapes that are growing in size, and another color may be assigned to shapes are shrinking in size. For example, shapes that are getting bigger over time can be colored red, whereas shapes that are shrinking over time can be colored blue. Therefore, the activity monitor 416 can determine that a size of a first group in the plurality of groups is increasing over a time period. The activity monitor 416 may then cause the geometric shape that is associated with the first group to be displayed in a first color. Similarly, the activity monitor 416 can determine that a size of a second group in the plurality of groups is decreasing over a time period, and may consequently cause the geometric shape associated with the second group to be displayed in the second color In another embodiment, the characteristics of the colors may be changed according to the rate of change in the size of each shape. In other words, shapes that are growing or shrinking quickly may use darker or more intense shades of a particular color. Similarly shapes that are growing or shrinking slowly may use lighter or less intense shades of the particular color. Characteristics of a color that may be changed can include the hue, depth, intensity, contrast, shade, brightness, and/or the like. For example, a shape related to a first group that is rapidly growing may have a bright red color. In contrast, a shape related to a second group that is slowly growing may have a dull red color. Various embodiments will change any of the color characteristics of geometric shapes depending on any characteristic of the size of the associated group.

To illustrate, rectangles 702-1 and 702-4 in FIG. 7 have a first color and a second color. After the size of the groups corresponding to these rectangles have shrunk, the colors of rectangles 702-1 and 702-4 in FIG. 9 have changed in their appearance. This example is merely illustrative. Because these figures are in black and white, is not possible to show changes in color intensity, hue, etc. that can be used by various embodiments discussed herein. However, it will be understood that any characteristic of these colors can be changed as described above.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of monitoring activity in a telephone contact center, the method comprising:
   receiving through an interface a plurality of customer interactions;
   storing a plurality of textual records in a memory, wherein each of the plurality of textual records is derived from a corresponding one of the plurality of customer interactions;

grouping, using a processor, the plurality of textual records into a plurality of groups, wherein each of the plurality of groups is associated with an attribute of the associated customer interaction; and causing to be displayed on a display device of a computer system, a graphical representation of the plurality of customer interactions comprising a plurality of geometric shapes, wherein:

each of the plurality of geometric shapes is associated with a corresponding one of the plurality of groups;

each of the plurality of geometric shapes comprises an area on the display device that is proportional to a size of the corresponding one of the plurality of groups relative to sizes of the remaining groups in the plurality of groups;

a first geometric shape in the plurality of geometric shapes is associated with a first group in the plurality of groups; and the first geometric shape is displayed at a first time in a first color if the first group is increasing in size, and the first geometric shape is displayed at the first time in a second color if the first group is decreasing in size.

2. The method of claim 1 further comprising:
determining that a size of a second group in the plurality of groups is increasing over a time period;
causing the geometric shape that is associated with the second group to be displayed in the first color;
determining that a size of a third group in the plurality of groups is decreasing over a time period; and
causing the geometric shape that is associated with the third group to be displayed in the second color.

3. The method of claim 1 further comprising changing an intensity of the first color based on a rate of change of the size of the first group.

4. The method of claim 1 further comprising:
receiving a second plurality of customer interactions that each originated at a time subsequent to a time that the plurality of customer interactions originated;
creating a second plurality of textual records, wherein each of the second plurality of textual records is derived from a corresponding one of the second plurality of customer interactions;
assigning each of the second plurality of textual records to the plurality of groups based on an attribute of each associated customer interaction; and
dynamically changing the area on the display device of each of the plurality of geometric shapes based on a new size of each of the plurality of groups.

5. The method of claim 1 further comprising:
identifying expired textual records in the plurality of groups;
removing the expired textual records from the plurality of groups; and
dynamically changing the area on the display device of each of the plurality of geometric shapes based on a new size of each of the plurality of groups.

6. The method of claim 1 further comprising:
receiving filter criteria;
ascertaining ones of the plurality of groups that do not meet the filter criteria; and
causing each of the plurality of geometric shapes associated with the ones of the plurality of groups to be removed from the display device.

7. The method of claim 6 wherein the filter criteria is related to a minimum size of a group.

8. The method of claim 6 wherein the filter criteria is related to a time period.

9. The method of claim 1 wherein the plurality of customer interactions comprises a recording of a web chat between a customer and a customer service representative.

10. The method of claim 1 wherein the plurality of customer interactions comprises a telephone conversation between a customer and a customer service representative.

11. The method of claim 10 wherein the plurality of textual records comprises a transcript of the telephone conversation.

12. The method of claim 1 wherein the plurality of geometric shapes forms a tree map.

13. A non-transitory computer-readable memory having stored thereon a sequence of instructions which, when executed by one or more processors, causes the one or more processors to monitor activity in a telephone contact center by:

receiving through an interface a plurality of customer interactions;

storing a plurality of textual records in a memory, wherein each of the plurality of textual records is derived from a corresponding one of the plurality of customer interactions;

grouping, using a processor, the plurality of textual records into a plurality of groups, wherein each of the plurality of groups is associated with an attribute of the associated customer interaction; and causing to be displayed on a display device of a computer system, a graphical representation of the plurality of customer interactions comprising a plurality of geometric shapes, wherein:

each of the plurality of geometric shapes is associated with a corresponding one of the plurality of groups; and each of the plurality of geometric shapes comprises an area on the display device that is proportional to a size of the corresponding one of the plurality of groups relative to sizes of the remaining groups in the plurality of groups;

a first geometric shape in the plurality of geometric shapes is associated with a first group in the plurality of groups; and the first geometric shape is displayed at a first time in a first color if the first group is increasing in size, and the first geometric shape is displayed at the first time in a second color if the first group is decreasing in size.

14. The non-transitory computer-readable memory according to claim 13, wherein the instructions further cause the one or more processors to monitor activity in a contact center by:
determining that a size of a second group in the plurality of groups is increasing over the time period;
causing the geometric shape that is associated with the second group to be displayed in a first color;
determining that a size of a third group in the plurality of groups is decreasing over the time period; and
causing the geometric shape that is associated with the third group to be displayed in a second color.

15. The non-transitory computer-readable memory according to claim 13, wherein the instructions further cause the one or more processors to monitor activity in a contact center by changing an intensity of the first color based on a rate of change of the size of the first group.

16. The non-transitory computer-readable memory according to claim 13, wherein the instructions further cause the one or more processors to monitor activity in a contact center by:

receiving a second plurality of customer interactions that each originated at a time subsequent to a time that the plurality of customer interactions originated;

creating a second plurality of textual records, wherein each of the second plurality of textual records is derived from a corresponding one of the second plurality of customer interactions;

assigning each of the second plurality of textual records to the plurality of groups based on an attribute of each associated customer interaction; and dynamically changing the area on the display device of each of the plurality of geometric shapes based on a new size of each of the plurality of groups.

17. A system comprising:

one or more processors; and a memory communicatively coupled with and readable by the one or more processors and having stored therein a sequence of instructions which, when executed by the one or more processor, cause the one or more processor to monitor activity in a telephone contact center by:

receiving through an interface a plurality of customer interactions;

storing a plurality of textual records in a memory, wherein each of the plurality of textual records is derived from a corresponding one of the plurality of customer interactions;

grouping, using a processor, the plurality of textual records into a plurality of groups, wherein each of the plurality of groups is associated with an attribute of the associated customer interaction;

causing to be displayed on a display device of a computer system, a graphical representation of the plurality of customer interactions comprising a plurality of geometric shapes, wherein:

each of the plurality of geometric shapes is associated with a corresponding one of the plurality of groups; and each of the plurality of geometric shapes comprises an area on the display device that is proportional to a size of the corresponding one of the plurality of groups relative to sizes of the remaining groups in the plurality of groups;

a first geometric shape in the plurality of geometric shapes is associated with a first group in the plurality of groups; and the first geometric shape is displayed at a first time in a first color if the first group is increasing in size, and the first geometric shape is displayed at the first time in a second color if the first group is decreasing in size.

18. The system of claim 17 wherein the instructions further cause the one or more processors to monitor activity in a contact center by:

identifying expired textual records in the plurality of groups;

removing the expired textual records from the plurality of groups; and dynamically changing the area on the display device of each of the plurality of geometric shapes based on a new size of each of the plurality of groups.

19. The system of claim 18 wherein the filter criteria is related to a minimum size of a group.

20. The system of claim 18 wherein the filter criteria is related to a time period.

* * * * *

UNITED STATES PATENT AND TRADEMARK OFFICE
CERTIFICATE OF CORRECTION

PATENT NO. : 8,897,424 B2  Page 1 of 1
APPLICATION NO. : 13/546235
DATED : November 25, 2014
INVENTOR(S) : Werner It is certified that error appears in the above-identified patent and that said Letters Patent is hereby corrected as shown below:

In the Specification

In column 14, line 13, delete "color" and insert -- color. --, therefor.

Signed and Sealed this
Twenty-eighth Day of July, 2015

Michelle K. Lee
*Director of the United States Patent and Trademark Office*